April 19, 1960 D. W. MOREHOUSE 2,932,904
DRYER FOR GRANULAR MATERIALS
Filed Dec. 31, 1956 2 Sheets-Sheet 1
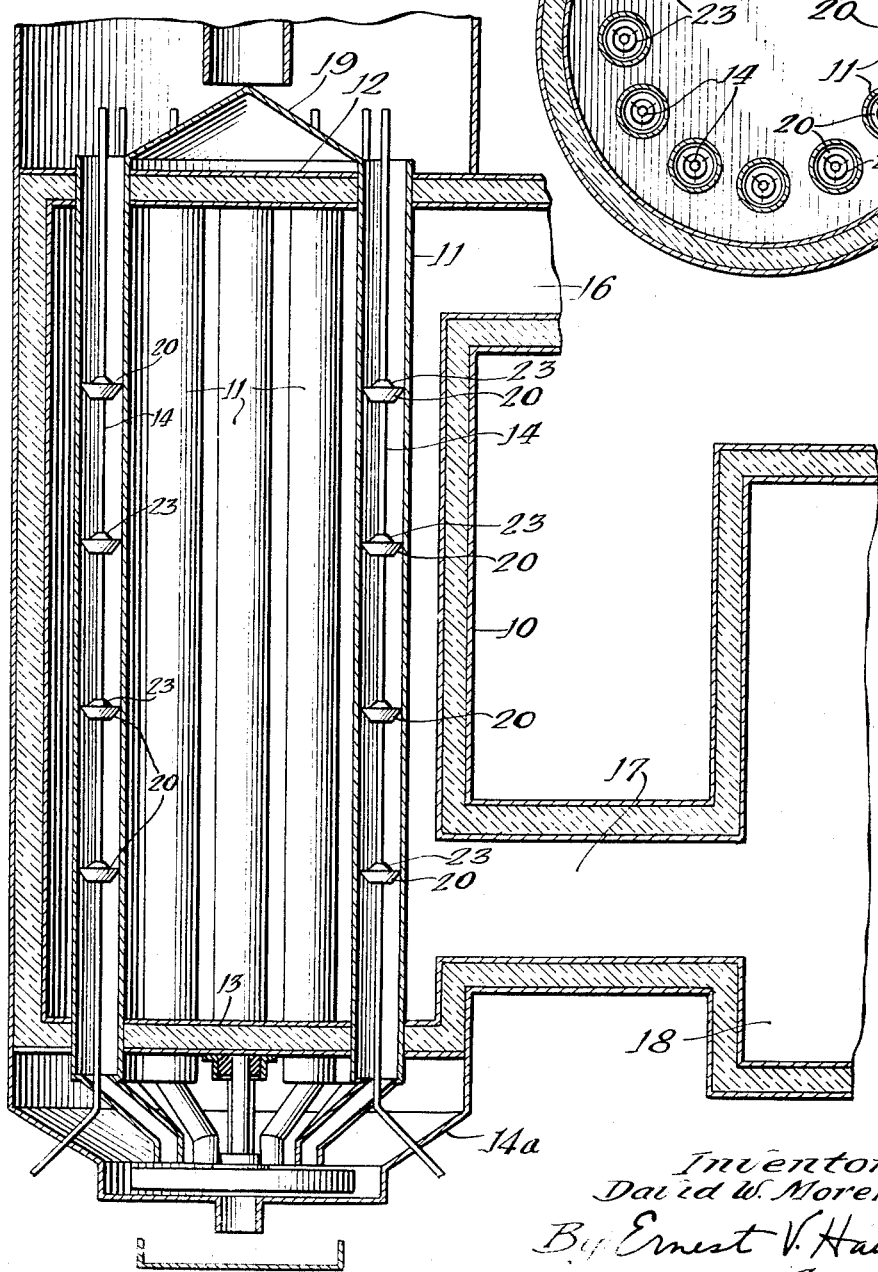
Inventor:
David W. Morehouse
By Ernest V. Haines
Attorney April 19, 1960   D. W. MOREHOUSE   2,932,904
DRYER FOR GRANULAR MATERIALS
Filed Dec. 31, 1956   2 Sheets-Sheet 2
FIG.3
FIG.4
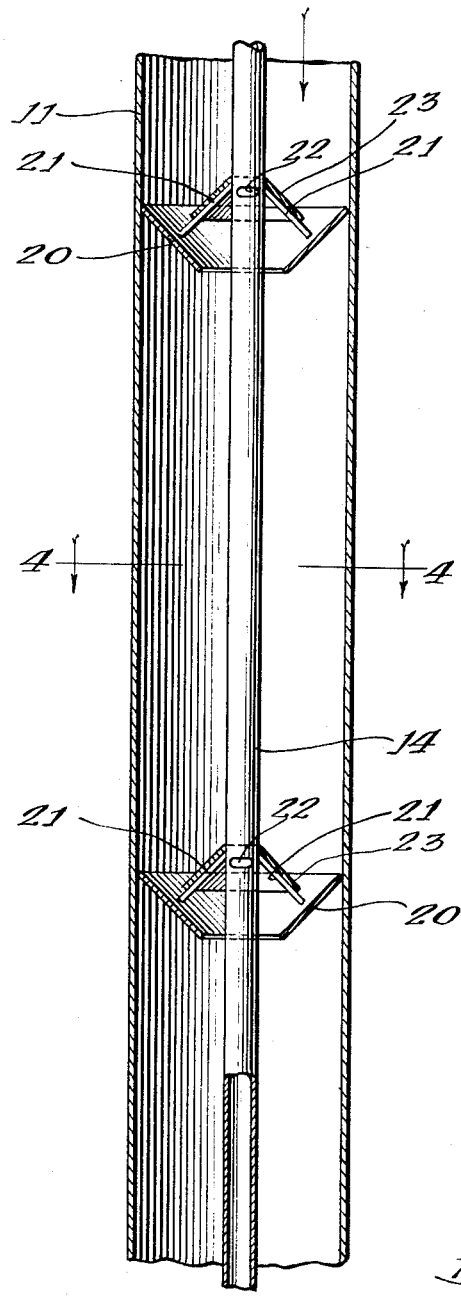
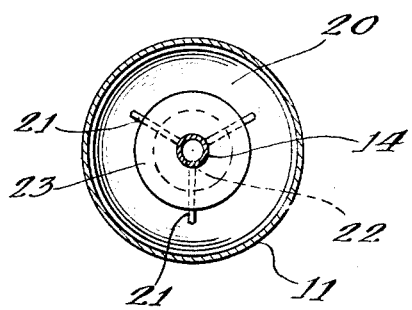
Inventor:
David W. Morehouse
By: Ernest V. Haines
Attorney United States Patent Office 2,932,904
Patented Apr. 19, 1960

2,932,904
DRYER FOR GRANULAR MATERIALS

David W. Morehouse, Lakeland, Fla., assignor to International Minerals & Chemical Corporation, a corporation of New York Application December 31, 1956, Serial No. 631,521

2 Claims. (Cl. 34—176)

This invention relates to apparatus for drying granular solids. More particularly, it relates to heat exchanger apparatus and means for controlling and directing the flow of granular solids through the interior of the heat exchanger tubes.

Granular solids generally are heated by indirect heating methods when the products are to be subsequently processed in order to avoid contamination with products of combustion. Interchange of heat between gases and dry solids is far more difficult to control than heat exchanged, for example, between gases and a liquid or a liquid and a liquid. Unless the solids are continuously moved, the solids tend to develop pockets of overheated material which show either decomposition or fusion or other undesirable results.

Heat exchanger apparatus for drying grain is shown in Provost, United States Patent No. 940,190. This apparatus shows wires or rods extended longitudinally through the tubes. The rods support a series of spaced conical baffles which cooperate with baffles secured to the tube walls for the purpose of turning grain as it passes downwardly through the tubes. This apparatus arrangement tends to drive steam and gases to the tube walls where it forms a film at least partially insulating the solids from contact with the heat exchanger surface.

It is a primary object of this invention to overcome the shortcomings and disadvantages of apparatus heretofore in use.

It is another object of this invention to provide apparatus for removal of steam adjacent the central axis of a tube.

It is still another object of this invention to provide a cone equalizer adapted to insure that no one portion of the solids stays in contact with heat exchanger tube walls for an extended period.

It is a further object of this invention to provide cone equalizers which will produce mixing of granular solids with a minimum amount of agitation capable of effecting attrition or other undesirable effects.

It is a still further object of this invention to provide cone equalizers which move solids after contact with the heat wall to the tube center and replace the heated particles at the wall with cooler particles from the central area of the tube.

Briefly, the apparatus comprises a vent tube member positioned at the axial center of heat exchanger tubes, the vent tube member having spaced ports therein for exhausting steam or water vapor containing gases from the tube. Mounted in spaced longitudinal relationship on the tubular member are baffles adapted to block the heat exchanger tube from the tube wall to a point adjacent the centrally located vent pipe.

The baffles, generally in the form of truncated conical members, are mounted on the tubular member by means of support arms with the large diameter base of the conical member mounted toward the feed end of the tube. This largest diameter or base of the cone is adapted to be approximately the same as the inside diameter of the tubes, i.e., adapted for a sliding but tight fit so that upon occasion a tubular member and its associated cones can be withdrawn from the tube.

The small base of the truncated conical member which forms the discharge outlet for solids from one segment of the tubes to the next, will vary in area depending upon the slope of the conical member. Generally, the slope is varied from about 30° to 60° from the horizontal with about a 45° angle preferred. When using the 45° slope for the cone or baffle closing a 7¾" ID tube, the small base provides an opening of approximately 3" in diameter. It will be recognized that the above discussion assumes round heat exchanger tubes but tubes other than round can be adapted with appropriately shaped baffles and still not depart from the basic concepts herein discussed.

Referring to the accompanying drawings for a fuller understanding of the invention, wherein there is illustrated a preferred form of apparatus;

Figure 1 is a horizontal cross-sectional view of the heat exchanger unit.

Figure 2 is a vertical cross-sectional view of the same heat exchanger unit.

Figure 3 is a fragmentary vertical cross-sectional view of the tube bundle unit showing the conical members and steam vent.

Figure 4 is a cross-sectional view taken along line 4—4 of Figure 3.

With reference to Figures 1–4 inclusive, the numeral 10 indicates a shell preferably cylindrical in shape. Within the shell 10 are spaced tube members 11 generally of cylindrical shape. Tubes 11 are secured to the top and bottom headers 12 and 13 which close the top and bottom of shell 10. Within tubes 11 are positioned vent pipes 14 of relatively small diameter compared to tubes 11. These pipes, as shown in Figure 2, extend downwardly through a material receiving chamber 14a disposed below header 13 and terminate exteriorly of such chamber. Vent pipes 14 are provided at vertically spaced intervals with apertures or ports 22 which are preferably directed downwardly and radially, transverse to the longitudinal axis of shell 10 as a precaution against material entering the apertures.

Shell 10 is provided adjacent header 12 with a conduit member 16 which is an outlet for heating gases passing through the jacket formed about tubes 11 by shell 10. Shell 10 is also provided adjacent the header 13 with a conduit member 17, communicating with the interior of shell 10 which is an inlet for heating gases delivered from furnace 18. Header 12 is provided with a cone member 19 positioned with its vertical axis in alignment with the longitudinal axis of the shell 10. Cone 19 is a distributor for directing feed particles into the tubes 11. Below the header 13 there is positioned solids removal apparatus which forms no part of the present invention but whose purpose is to unload at a reasonable rate, a predetermined quantity of solids from beneath the tube outlets, Mounted on vent pipes 14 are the truncated conical members 20. Conical members 20 are supported from vent pipe 14 by a plurality of support arms 21 which hold the cone so that the small base thereof is removed from the vent pipe and thus provides a throat through which solids will flow. Each conical member 20 is positioned with its larger base faced in the direction of the feed and is of a size adapted to make a sliding fit with the tubes 11. Conical member 20 is shown as having its sides adapted to be at an angle of 45° to the horizontal.

Mounted on vent pipes 14 as by welding, are cones 23 which serve the double purpose of collecting and funneling steam to the outlet ports 22 and of preventing solids from entering the ports 22. Cones 23 are secured to and circumscribe said vent pipes at a point adjacent to and above each of the apertures or ports, i.e., when the pipes are vertical, the cone is attached to the vent pipe at a point vertically disposed above the apertures. In the preferred modification, the cone 23 is shown resting on the supports for baffle 20 but the ports 22 and cones 23 need not be positioned adjacent the baffles 20.

In the operation of this heating unit, it is generally preferred to feed granular material over cone 19 at a rate designed to maintain the solids level in tubes 11 a few inches below the top. 7¾" ID tubes can be operated to heat from 2 to 15 tons of solids per hour per tube depending upon the angle and slope of the cone and the solids removal rate established by the unloader. The solids accumulated in a bed almost filling the tubes will move by gravity continuously or intermittently depending upon the character of the solids removal apparatus. Solids pass down from one tube segment to the other with solids from the outside being brought almost to the longitudinal axis center of the segment before being allowed to spread out thus creating a mixing action under substantially non-agitating conditions.

The invention will be further illustrated by the following example, given by way of illustration, and without any intention to limit the invention thereto.

*Example*

Florida phosphate pebble obtained as washer debris, having, by screen analysis, particles in the range of −24 +100 mesh, was subjected to washing and desliming operations. Upon removal from the storage pile, this material had a moisture content of about 12%. The material was initially dried to a moisture content of about 1.3% by suitable apparatus, and this product was fed to the heat exchanger hereinabove described. The granular solids entered the heat exchanger at a temperature of approximately 195° F. with a 12" spacing between conical members and a 4" spacing between steam outlet ports. One 7¾" ID tube heated one ton per hour of pebble from a temperature from 195° F. to 380° F. in approximately 9 minutes. The 380° F. phosphate product, upon cooling, showed a moisture content of less than 0.1%.

Having thus described my invention, what I claim is:

1. A heating unit for drying granular materials under substantially non-agitating conditions which comprises an upstanding shell, inlet and outlet members for heating gases communicating with the interior of said shell adjacent the upper and lower ends thereof respectively, tubular members positioned within said shell, top and bottom headers closing the ends of said shell and having spaced apertures therein of approximately the same cross-sectional configuration as said tubular members, said tubular members being secured to said headers so that the longitudinal axes of said tubular members are in alignment with the central axis of the respective apertures in said top and bottom headers and said tubular members communicate with the spacers above and below said top and bottom headers respectively, a material receiving chamber below said bottom header for collection of materials dried in said tubular members, a vent pipe centrally positioned within each of said tubular members and extending longitudinally throughout the length of such tubular member terminating above said top header at its upper end and exteriorly of said chamber at its lower end, longitudinally spaced apertures in each of said vent pipes, truncated cones secured to and circumscribing said vent pipes at points immediately adjacent to and vertically disposed above the apertures, said cones extending downwardly and transversely to the horizontal, the cross-sectional area blocked by the cones being only a portion of the cross-sectional area of the tubular member, longitudinally spaced truncated conical baffle members supported at spaced positions on each of said vent pipes, said baffle members blocking the tubular member from the tube wall to a point adjacent the centrally located vent pipe and sloped at an angle transverse to the horizontal so that the lowest point of the baffle member is adjacent the longitudinal central axis of the tubular member, and solids removal means for said chamber.

2. A heating unit for drying granular materials as recited in claim 1 wherein the wall of each of said conical baffle members is sloped toward the central axis of the tubular member with which it is associated at an angle between 30° and 60° from the horizontal.

References Cited in the file of this patent

UNITED STATES PATENTS

| 685,336 | Leroy et al. | Oct. 29, 1901 |
| 803,424 | Matcham | Oct. 31, 1905 |
| 1,181,121 | Duncan | May 2, 1916 |

FOREIGN PATENTS

| 36,558 | Austria | Mar. 10, 1909 |

UNITED STATES PATENT OFFICE
CERTIFICATE OF CORRECTION

Patent No. 2,932,904                                                  April 19, 1960

David W. Morehouse

It is hereby certified that error appears in the printed specification of the above numbered patent requiring correction and that the said Letters Patent should read as corrected below.

Column 4, line 10, for "spacers" read -- spaces --.

Signed and sealed this 11th day of October 1960.

(SEAL)
Attest:

KARL H. AXLINE
Attesting Officer

ROBERT C. WATSON
Commissioner of Patents